United States Patent [19]

Crowdy

[11] 3,767,148
[45] Oct. 23, 1973

[54] APPARATUS FOR SUPPORTING MACHINES

[75] Inventor: Edmund Porter Crowdy, Newcastle upon Tyne, England

[73] Assignee: Hawthorne Leslie (Engineers) Limited, Newcastle upon Tyne, England

[22] Filed: Sept. 20, 1971

[21] Appl. No.: 181,695

[52] U.S. Cl. .................................................. 248/25
[51] Int. Cl. .......................................... F16m 13/00
[58] Field of Search .................... 248/2, 12, 13, 15, 248/18, 19, 20, 21, 22, 24, 25, 350, DIG. 1

[56] References Cited
UNITED STATES PATENTS

| 1,871,708 | 8/1932 | Lea | 248/22 |
| 3,401,733 | 9/1968 | Circle | 248/25 X |
| 1,365,290 | 1/1921 | Stephens | 248/18 X |

FOREIGN PATENTS OR APPLICATIONS

| 418,431 | 2/1947 | Italy | 248/15 |
| 814,049 | 5/1959 | Great Britain | 248/15 |
| 603,878 | 4/1960 | Italy | 248/21 |

*Primary Examiner*—William H. Schultz
*Attorney*—Ostrolenk, Faber, Gerb & Soffen

[57] ABSTRACT

Apparatus for supporting a machine on a foundation to allow for expansion of the machine including a plurality of devices, each device comprising a first plate member having a contact face having a series of parallel corrugations and a hole, a second plate member having a contact face having a series of parallel corrugations adapted to fit the corrugations on the first plate member and a hole, a layer of resilient material located between the contact faces of the two plate members and a securement member adapted to extend through the hole in the first plate member in a tight fit and adapted to extend through the hole in the second plate member in a loose fit to allow the second plate member to move relative to the first plate member in the direction of the corrugations, this securement member being a bolt having a fixing means for securing the bolt to the machine, this fixing means being spaced from the portion of the bolt extending through the second plate member and the bolt is capable of elastic deformation to allow the machine to move relative to the fixed support.

13 Claims, 8 Drawing Figures

Patented Oct. 23, 1973

3,767,148

INVENTOR
EDMUND PORTER CROWDY
BY
Ostrolenk, Faber, Gerb & Soffen
ATTORNEYS

Patented Oct. 23, 1973 3,767,148

APPARATUS FOR SUPPORTING MACHINES

The present invention relates to an assembly for supporting a machine on a foundation.

It is desirable that any deformation occurring in the foundation is not communicated to the machine. It has been customary to support large machinery by providing a multiplicity of points of contact between the base of such machinery and a foundation which is regarded as having infinite rigidity compared with the supported structure. In such a system, it is usually necessary to allow for differential thermal expansion in the plane of the supporting points and this is accommodated by completely fixing one point, and permitting a single degree of freedom locally in the direction of the expansion to all the remaining points. The supported structure is regarded as completely restrained in a direction normal to the plane of the supporting points. The supporting foundation could be a concrete underbed as might be employed to carry stationary machinery or a fabricated assembly of steel plates and sections as used, for example, in ships.

Developments both in the design of machinery and of foundations have resulted in a situation in which the previous supposition that a completely rigid plane of support would be universally available for such machinery is no longer valid. Since machinery which can be distorted by unpredictable deformations of its support is liable to breakdown due for instance to induced misalignment producing local tribological failure between rolling or sliding pairs, it is becoming necessary to design such machinery so that it possesses sufficient inherent rigidity to maintain alignment against its own internally generated forces and to support it in such a manner that static and dynamic interaction with the foundation is safely contained without the risk of transmitting damaging deformations to the machinery.

The invention includes apparatus for supporting a machine on a fixed support including a plurality of devices, each device comprising a first plate member attached to the machine having a contact face having a series of parallel corrugations and a second plate member which could be attached to the foundation and has a contact face having a series of parallel corrugations adapted to intercalate the corrugations on the first plate member and a layer of a deformable, particularly a resilient material is located between the contact faces of the two plate members.

With this apparatus by aligning the axis of the corrugations with the direction of relative thermal expansion at each point of support, the machine as a whole, can be maintained in any desired alignment with any separately supported apparatus without inducing excessive internal stresses through constraining the natural requirement to expand. This feature is achieved by utilizing the property of the deformable or resilient material which renders it highly resistant to direct compression that is to forces at right angles to the axes of the corrugations in either the vertical or horizontal plane whilst displaying a low resistance to shear load or deformation in the direction of shear which may be induced by relative motion of the plates along the axes of their corrugations.

The invention also includes apparatus including a plurality of devices for supporting a machine, each device comprising a first member having a contact face of uneven contour, a second member having a contact face of uneven contour adapted to interlay the contour of the contact face of the first member and a layer of a deformable, particularly a resilient material located between the two contact faces which confers to the assembly the property of having a high degree of resistance to deformation in one direction within the plane of the contact faces and a very much lower degree of resistance to deformation in a direction within the same plane normal to the first direction.

An example will be described with reference to the accompanying drawings in which.

Figure 6:
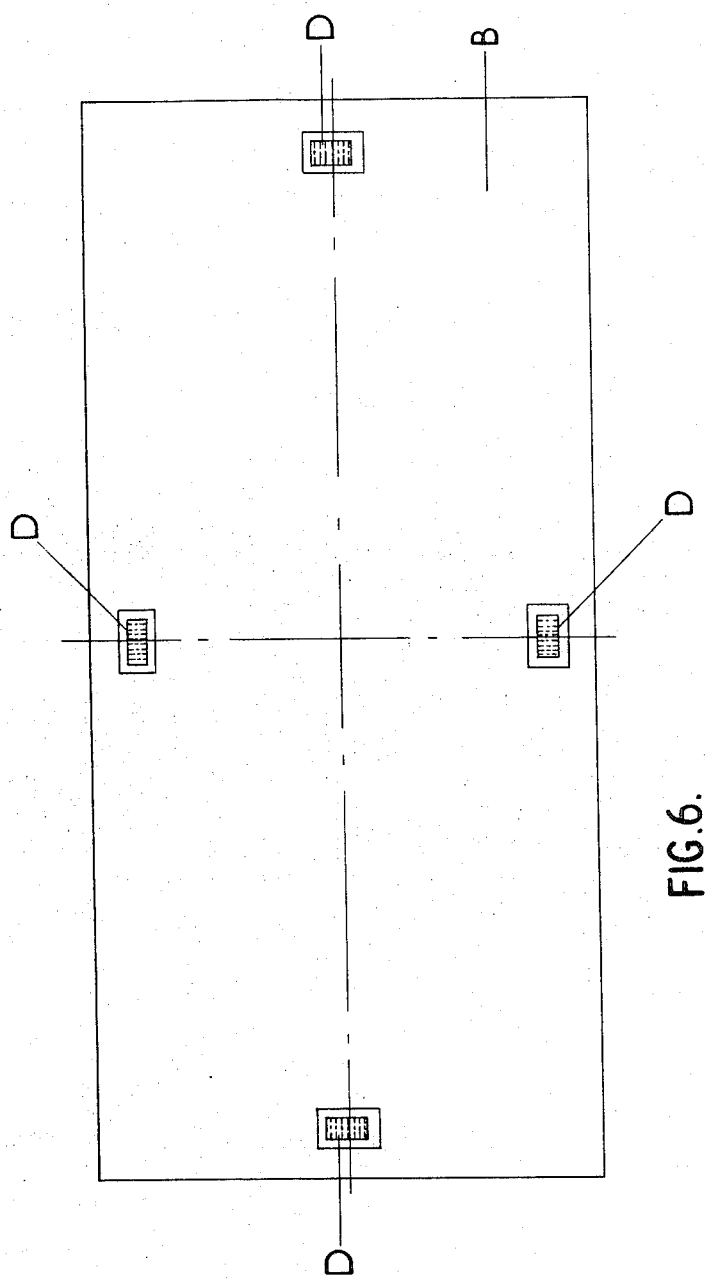

FIG. 6 shows a machine foundation or base B with four modified devices D of rectangular shape arranged correctly in place by having their axes of minimum resistance to deformation oriented along the lines between the support locations. This support system will have the property that the point on the machine determined by the intersection of the axes will remain fixed relative to the foundation while the machine, as a whole, undergoes uniform thermal expansion. If it were desired to confer this property onto some other point on the machine, the devices would be oriented so that their axes of minimum resistance to deformation all intersected at such point.

Figure 7:
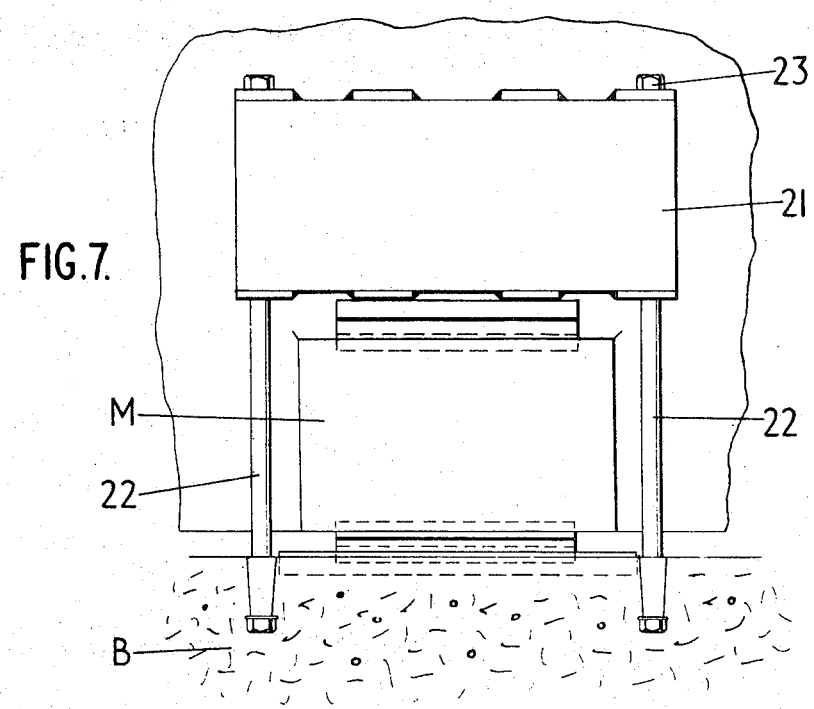
Figure 8:
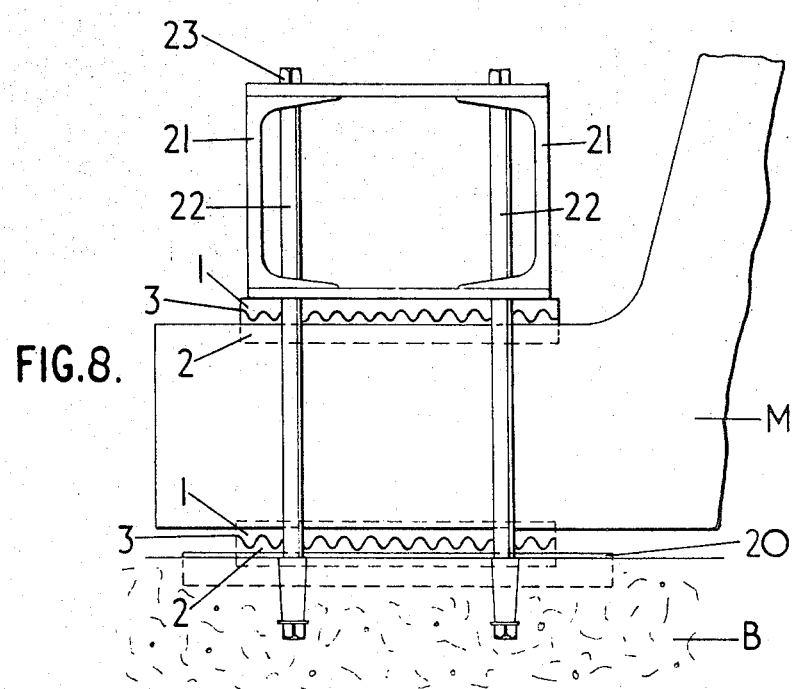

FIG. 7 shows another example where two support devices are clamped against the machine;

FIG. 8 is an end view of FIG. 7.

Figure 1:
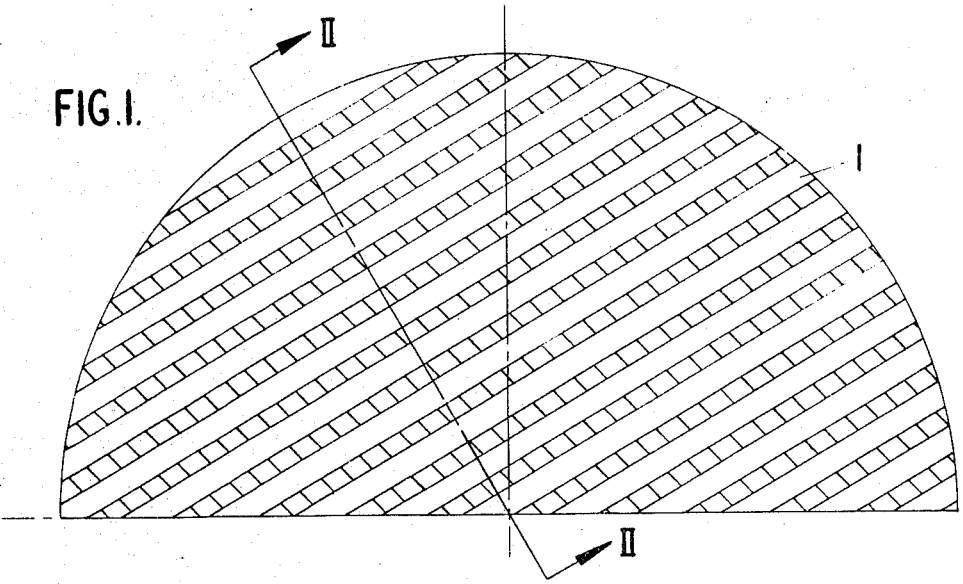
FIG. 1 shows the plan view of a typical plate on its corrugated surface being a section along the line I—I of FIG. 2 with the upper plate and membrane removed.
Figure 2:
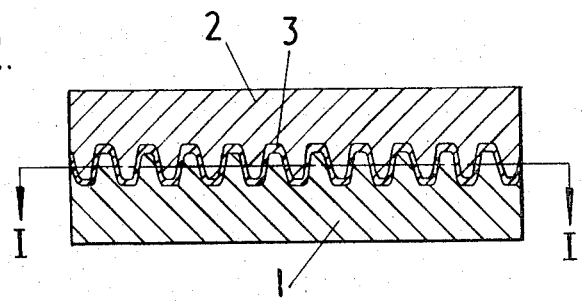
FIG. 2 shows a side view of such an assembly looking along the axis of the corrugations on to the section along the line II—II of FIG. 1.
Figure 5:
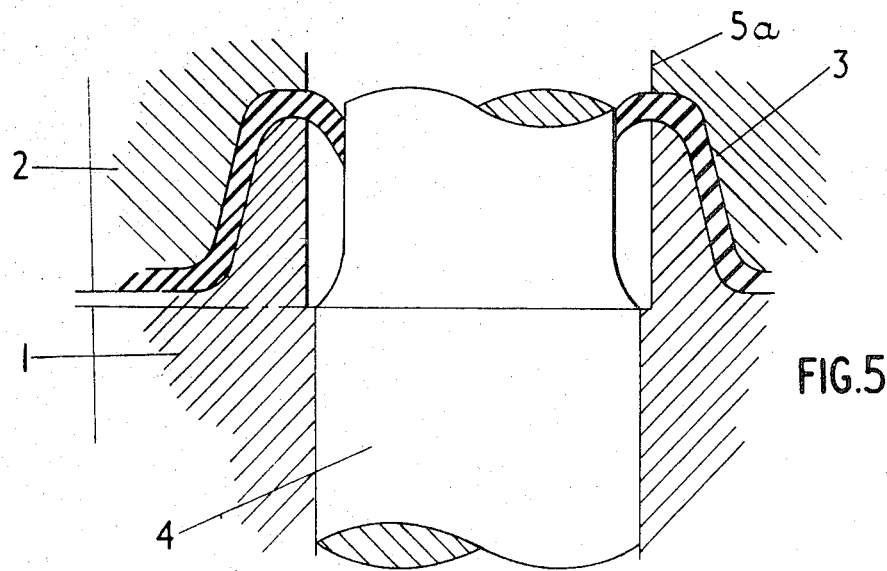
FIG. 5 shows a detail of FIG. 4 in larger scale.

The plates 1 and 2 shown in FIG. 2 are semi-circular in plan, but need not be so. The plates each have one corrugated surface and are assembled with their corrugations intercalated — as shown and a membrane 3 of at least slightly deformable or resilient material interposed. The significant property of this assembly is that it has a high degree of resistance to deformation in all directions normal to the axis of the corrugations, for in these said directions, movement of plate 2 relative to plate 1 would cause the deformable or resilient material 3 to be in substantially direct compression. In the direction parallel to the axis of the corrugations, the deformable or resilient material is in shear to which mode of deformation it reacts with a relatively low degree of resistance to deformation. The minimum possible number of points for supporting a machine is normally 2, 3, or 4. To allow for differential thermal expansion along one axis in the horizontal plane of support, a support point requiring provision for such expansion can possibly comprise a deformable connection having a high degree of resistance to deformation along two of its principle axes and a relatively low degree of stiffness along the remaining axis. By causing the deformable or resilient membrane in the device to adhere to the plates it may often be employed even when separating forces are present without any further restraint in the vertical direction. When large separating forces are involved, a second example shown in FIG. 3 can be used having compression means, which can be extended bolts 4 passing through holes 5 and 5a in the two plates 1 and 2 respectively as well as through holes in the machine foundation 7 or there can be an external clamping or other arrangement to hold the assembly in compression. This compression means need not be bolts but must be capable of withstanding all lifting forces and must not introduce any appreciable horizontal constraint between the foundation and the machine. The length of the bolt may be ten or twenty times the thickness of the assembly. The bolt by bending as an elastic cantilever allows relative lateral movement between the machine and the foundation.

The bolt 4 is rigidly secured to an upper plate 8 slightly spaced from an upper flange 9 by a layer of deformable or resilient material and spaced from the plate 2 and lower flange 6 so that as the flanges 9 and 6 move, due to thermal expansion, relative to the foundation 11 the bolt 4 moves freely in the hole in lower flange 6 but moves rigidly with upper flange 9 and this movement is taken up by lateral elastic deformation in the long shank of the bolt between flange 6 and flange 9.

The upper plate 2 of the assembly is secured to the base of the machine by fitting into a recess and the lower plate 1 of the assembly is secured to the surface of the foundation by the tight fit of the bolts 4 within holes 5 in way of plate 1 only The connection between the machine and the foundation is made by introducing one of these devices at each of the support points requiring a degree of horizontal flexibility oriented so that the axis of its corrugation lies along the local direction of thermal expansion for example as shown in FIG. 6. The directions of thermal expansion of each support device located at the different places where the machine is supported on the foundation or other fixed support should all coincide at a common point which will be the position where the machine remains stationary relative to the foundation. This common point can be a point of contact of the machine with the foundation or a place where the machine is suspended out of contact with the foundation.

Thus there is a device for mounting large machines which can allow relative motion in certain directions to a limited degree without using sliding members yet providing high rigidity in other directions.

The membrane 3 may only have a very little resilience or flexibility.

Figure 3:
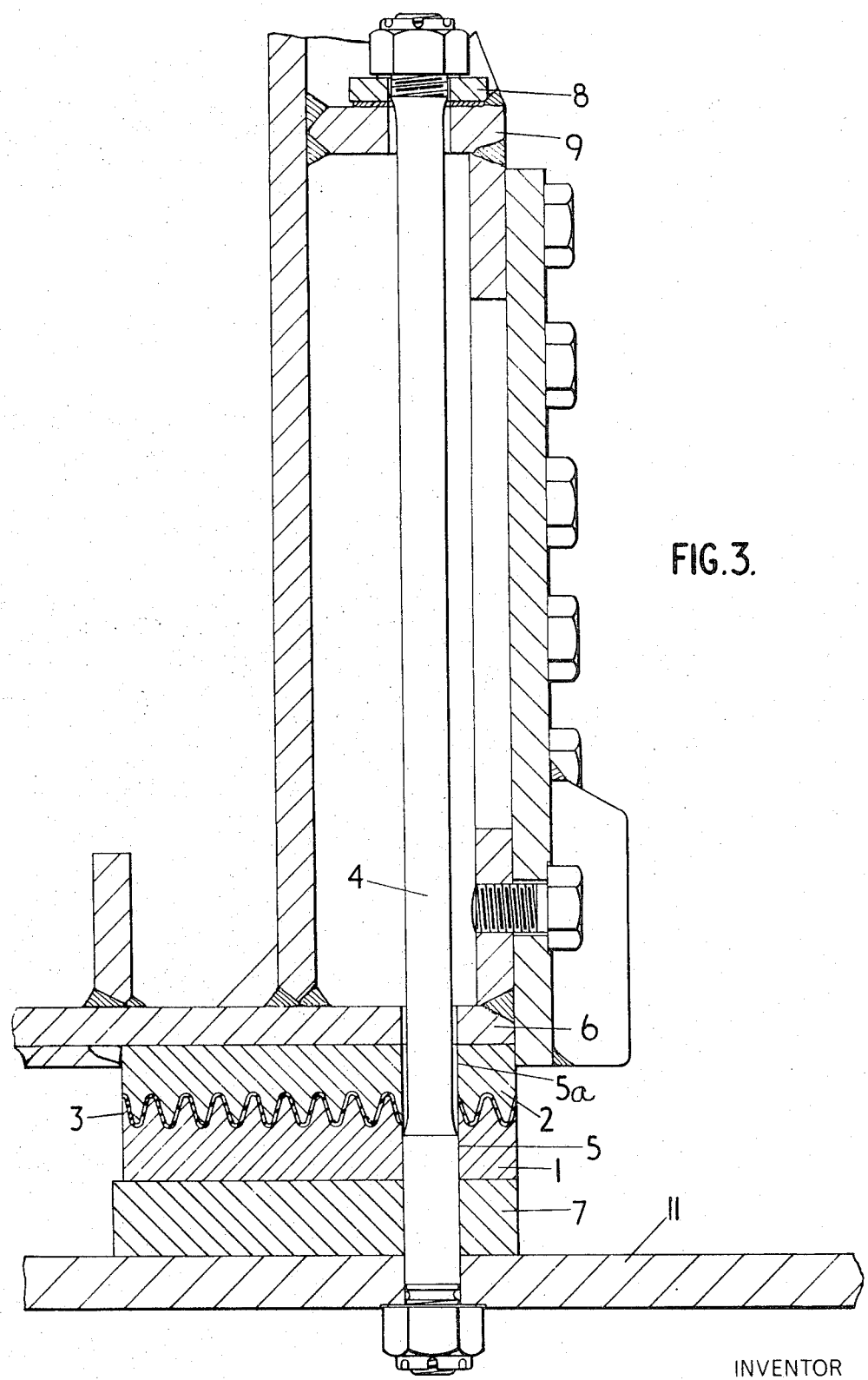
FIG. 3 shows another example with compression means in the form of a bolt and is a section on the line III—III of FIG. 4.
Figure 4:
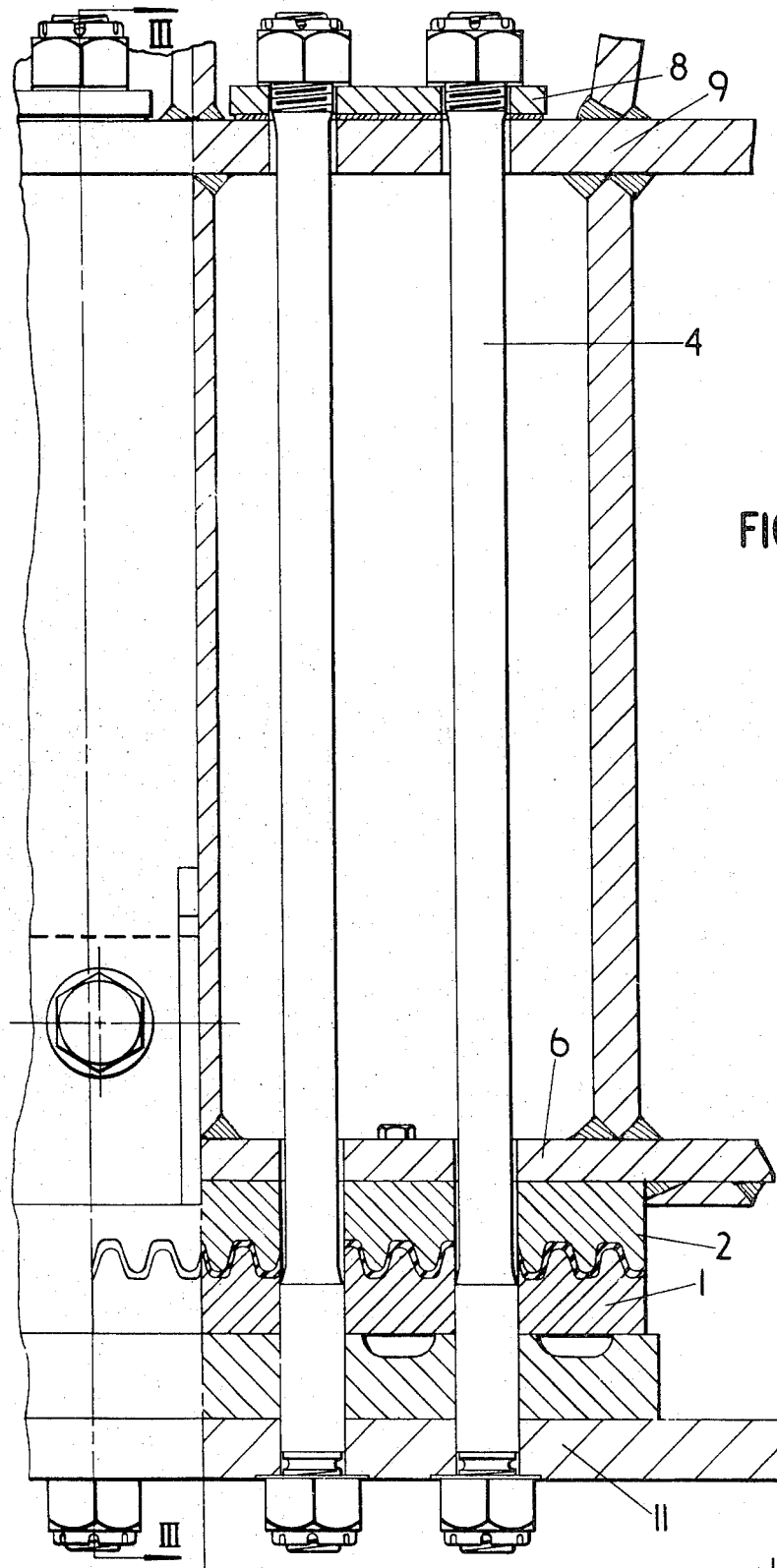
FIG. 4 shows a part of a machine with a second example incorporated.

The axis of the corrugations is not in the plane of FIG. 3 or FIG. 4 but the pitch of the corrugations in these figures is different due to their different inclination to the axis of the corrugations.

In FIGS. 7, 8 there are two devices, each comprising two plates 1 and 2 spaced by a layer 3 of deformable or resilient material 3. These two devices are arranged vertically spaced from each other respectively above and below a projecting lug of a machine M. The lower device rests in a plate 20 located in the base B. The upper device is urged downwardly by an upper beam 21 mounted on four bolts 22 anchored to the base B and located around the outer edge of the lug of the machine. Alternatively a clamping member could be used. In FIG. 7 and 8, tightening of nuts 23 presses plates 1 and 2 against each other.

I claim:

1. Apparatus for supporting a machine on a foundation, comprising a plurality of separated support devices; each said device comprising:
    a first plate member having a contact face carrying a series of rectilinear parallel grooves and ridges;
    a second plate member having a contact face oriented parallel to said contact face of said first plate member and itself carrying a series of rectilinear parallel ridges and grooves that are adapted to intercalate said grooves and ridges on said first plate member;
    a layer of deformable material positioned between said contact faces of said plate members.
2. Apparatus as claimed in claim 1, wherein said layer of material is stuck to both said plate members.
3. Apparatus as claimed in claim 1, wherein the longitudinal axis of the grooves of said contact faces of a plurality of devices all intersect at a single location.
4. Apparatus for supporting a machine on a fixed support or foundation, including a plurality of devices; each said device comprising:
    a first plate member having a contact face having a first contour which is uneven in a first cross-sectional plane through said first plate member and which is straight in a second cross-sectional plane through said first plate member;
    a second plate member having a contact face having a second contour which is uneven in a first cross-sectional plane through said second plate member and is straight in a second cross-sectional plane through said second plate member;
    said second contour being adaptable to be interlaid in said first contour and said second plate member being movable relative to said first plate member along said second cross-sectional plane of said second plate member;
    a layer of deformable material positioned between said contact faces of said plate member.
5. Apparatus as claimed in claim 4, wherein said layer of material is stuck to both said plate members.
6. Apparatus as claimed in claim 4, including connecting means for connecting one said plate member to the other said plate member in a manner which allows the recited said relative movement between said plate members.
7. Apparatus as claimed in claim 6, wherein said connecting means also secures one said plate member to a foundation for the machine.
8. Apparatus as claimed in claim 7, further comprising a hole through said first plate member and a hole through said second plate member; said connecting means including a member adapted to extend through said first and second plate member holes; said second plate member hole being sufficiently large to provide a space extending in the direction of said second plate member and in said second cross-sectional plane thereof, so as to allow said second plate member to move relative to said first plate member; said connecting means member being adapted to be secured to a part of the machine and to the foundation for the machine.
9. Apparatus as claimed in claim 8, wherein said connecting means member has a portion of reduced diameter which is the portion thereof extending through said second plate member hole.
10. Apparatus as claimed in claim 8, wherein said connecting means member comprises a bolt; a portion of said bolt passing through said plate member holes; said bolt portion being spaced away from the machine part to which said bolt is attached; said bolt being adapted for elastic deformation to permit the machine to move relative to its fixed support.

11. Apparatus as claimed in claim 7 wherein said connecting means includes a lower member adapted to be secured to the fixed support for the machine and adapted to support one of said plate members; an upper member and operating means for moving said upper and lower members together thereby to clamp said plate members together.

12. Apparatus as claimed in claim 4, wherein said second cross-sectional planes of said contact faces of a plurality of devices all intersect at a single location.

13. Apparatus as claimed in claim 6, comprising a first pair of said devices;
one said device of said pair being positioned above a part of a machine and the other said device being positioned below the part of the machine; said connecting means joining said pair of said devices and drawing them together to hold the part of the machine therebetween.

* * * * *